United States Patent
Pastena et al.

(10) Patent No.: US 12,404,397 B2
(45) Date of Patent: *Sep. 2, 2025

(54) POLYMER WITH LOW MOLECULAR WEIGHT PORTION AND HIGH GLASS TRANSITION TEMPERATURE PORTION FOR EARLY BLOCK RESISTANCE

(71) Applicant: Columbia Insurance Company, Omaha, NE (US)

(72) Inventors: Gianna Pastena, Flanders, NJ (US); Yong Yang, Hillsborough, NJ (US); Stefanie Iannacone, Sparta, NJ (US); Johanna L. Garcia, Lake Hopatcong, NJ (US)

(73) Assignee: Columbia Insurance Company, Omaha, NE (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/155,292

(22) Filed: Jan. 17, 2023

(65) Prior Publication Data
US 2023/0159738 A1   May 25, 2023

Related U.S. Application Data

(63) Continuation-in-part of application No. 16/921,059, filed on Jul. 6, 2020, now Pat. No. 11,685,800.

(51) Int. Cl.

| | |
|---|---|
| *C08L 33/08* | (2006.01) |
| *C08F 2/00* | (2006.01) |
| *C08F 2/26* | (2006.01) |
| *C08F 2/38* | (2006.01) |
| *C08F 220/06* | (2006.01) |
| *C08F 220/14* | (2006.01) |
| *C08F 220/18* | (2006.01) |
| *C08F 220/34* | (2006.01) |
| *C08F 220/56* | (2006.01) |
| *C09D 133/08* | (2006.01) |

(52) U.S. Cl.
CPC .............. *C08L 33/08* (2013.01); *C08F 2/001* (2013.01); *C08F 2/26* (2013.01); *C08F 2/38* (2013.01); *C08F 220/06* (2013.01); *C08F 220/14* (2013.01); *C08F 220/1808* (2020.02); *C08F 220/34* (2013.01); *C08F 220/56* (2013.01); *C09D 133/08* (2013.01); *C08L 2201/52* (2013.01); *C08L 2207/53* (2013.01)

(58) Field of Classification Search
CPC .. C08L 33/08; C08L 2201/52; C08L 2207/54; C08F 2/001; C08F 2/26; C08F 220/06; C08F 220/14; C08F 220/1808; C08F 220/34; C08F 220/56; C08F 265/06; C08F 285/00; C08F 2/22; C09D 133/08; C09D 5/022; C09D 133/26; C09D 151/003
USPC ......................................................... 523/201
See application file for complete search history.

(56) References Cited

U.S. PATENT DOCUMENTS

| | | | |
|---|---|---|---|
| 5,356,683 A | 10/1994 | Egolf et al. | |
| 11,685,800 B2 * | 6/2023 | Pastena .................. | C08L 33/12 523/201 |
| 2013/0183536 A1 * | 7/2013 | Kaneda .................. | C08L 51/04 524/496 |
| 2014/0235752 A1 * | 8/2014 | Gharapetian ........ | C09D 133/12 523/201 |
| 2023/0159738 A1 | 5/2023 | Pastena et al. | |

OTHER PUBLICATIONS

International Search Report and Written Opinion issued in connection the corresponding International Application No. PCT/US2023/085064 on Apr. 11, 2024.

\* cited by examiner

*Primary Examiner* — Hannah J Pak
(74) *Attorney, Agent, or Firm* — The H.T. Than Law Group

(57) ABSTRACT

Polymers including single-stage and multi-stage polymers that combine the properties of the structural integrity of a polymer with a high glass transition temperature (Tg) with a softer, lower molecular weight polymer that coalesces quickly and is flexible to maintain scrubbability are disclosed. The single-stage or an outer stage of the multi-stage polymer contains both a cross-linking monomer and a chain transfer agent at different portions of the stage. Architectural compositions containing these film-forming polymers exhibit anti-blocking properties within one hour from being applied to a substrate.

20 Claims, No Drawings

POLYMER WITH LOW MOLECULAR WEIGHT PORTION AND HIGH GLASS TRANSITION TEMPERATURE PORTION FOR EARLY BLOCK RESISTANCE

CROSS-REFERENCE TO RELATED PATENT APPLICATION

The present patent application is a continuation-in-part under 35 U.S.C. § 120 to U.S. patent application Ser. No. 16/921,059, filed on 6 Jul. 2020. The parent application is incorporated herein by reference in its entirety.

FIELD OF THE INVENTION

The present invention is directed to a polymer that combines the properties of the structural integrity of a polymer with a high glass transition temperature (Tg) with a softer, lower molecular weight polymer that coalesces quickly and is flexible to maintain scrubbability.

BACKGROUND OF THE INVENTION

An issue with painting architectural structures such as homes and commercial buildings is that when two freshly painted surfaces come into contact with each other these surfaces may adhere to each other. Hence, windows and frames or doors and jambs can become stuck to each other. When force is applied to open windows or doors, the paint films can peel away from the painted surfaces leaving unsightly patterns on the surfaces. This is known in the painting industry as blocking. A common measurement of blocking, e.g., ASTM D4946-89, is to rate the painted surfaces after 24 hours or after 7 days of drying, as discussed in U.S. Pat. Nos. 9,611,393, 10,301,501 and 10,273,378, among others.

Soft polymers, i.e., low Tg polymers, when incorporated in paints and stains exhibit higher blocking. Paints having a high gloss or sheen also show more blocking than lower gloss paints due to the higher resin content. Tackiness is a similar phenomenon that describes the tendency of dry paint on a surface to tack or to stick on a person or object that presses against the painted surface particular in a high humidity environment.

U.S. patent publication No. US 2005/0107527 discloses a block-resistant core-shell polymer that requires a weak acid monomer, a strong acid monomer and a monomer containing a keto group in the core stage and in the shell stage. US 2005/0107527 discloses varying various components in the core-shell structure that substantially maintain the block resistant property. However, US 2005/0107527 conducted its block-resistant test after the paint films are dried after 1 day, which is considerably longer than real-life paint applications. Commonly owned U.S. patent publication No. US 2014/0235752 discloses a core-shell-skin self-coalescing polymer that utilizes a chain transfer agent added to the last 10% of the shell monomer mixture during the emulsion polymerization process to form the thin skin with lower molecular weight.

However, leaving painted surfaces for a day or seven days after painting to ascertain the level of blocking is impractical and does not approximate real-life situations. Hence, there remains a need for aqueous architectural compositions such as paints or stains that exhibit good blocking resistance when the compositions dry or soon after being applied to surfaces.

SUMMARY OF THE INVENTION

Hence, a preferred embodiment of the present invention is directed to architectural compositions, including paint and stain compositions that display block resistance when the compositions dry or soon after being applied to surfaces or substrates, preferably within one-hour after being applied on surfaces or substrates.

As used herein, a stage of a latex particle in a multistage latex particle is defined as having the same film forming monomer mixture, excluding any cross-linking monomer, any wet adhesion monomers, any monomers having a weight percentage of less than about 1.5% and unavailable Tg information, and any chain transfer agents. A portion of a stage in a multistage latex particle or in a single stage latex particle is a part of said stage with a cross-linking monomer added, a CTA added, or without a cross-linking monomer or CTA added.

An embodiment of the present invention is directed to a copolymer latex particle comprising at least one stage. The at least one stage is formed from a first monomer mixture of one or more film forming monomers, and the at least one stage is copolymerized with at least one crosslinking monomer to form an inner portion of said at least one stage. An outer portion of the at least one stage is copolymerized in the presence of a chain transfer agent (CTA). The at least one crosslinking monomer ranges from about 1 wt. % to about 8 wt. %, preferably from about 2 wt. % to about 7 wt. %, and more preferably from about 3 wt. % to about 5 wt. % of the entire polymer of the total monomers in the latex particle. The CTA ranges from about 0.2 wt. % to about 1 wt. %, preferably from about 0.25 wt. % to about 0.90 wt. %, more preferably from about 0.30 wt. % to about 0.80 wt. % of the entire polymer of the total monomers in the latex particle.

Preferably, the inner portion and the outer portion of the at least one stage do not overlap. The inner portion and the outer portion are preferably spaced apart by an intervening portion that does not contain the at least one crosslinking monomer and the CTA. The outer portion makes up from about 10 wt. % to about 60 wt. % of said at least one stage, preferably from about 15 wt. % to about 35 wt. % of said at least one stage, more preferably about 20 wt. %±1.5 wt. %.

The copolymer latex particle may further comprise at least one inner stage formed from an inner monomer mixture of one or more film forming monomers that is different than the first monomer mixture, wherein the calculated glass transition temperature (Tgc) of the at least one inner stage ranges from about from about 25° C. to about 100° C., preferably from about 30° C. to about 85° C. and preferably from about 35° C. to about 75° C. The inner monomer mixture may further comprise the at least one crosslinking monomer. The Tgc of the at least one inner stage is about 20° C. to about 90° C. higher than the Tgc of said at least one stage, preferably from about 50° C. to about 80° C. higher, preferably from about 55° C. to about 75° C. higher.

The copolymer latex particle may further comprise an innermost stage inside of the at least one inner stage or a second inner stage outside of the at least one inner stage.

The overall weight average molecular weight of the at least one stage ranges from about 30,000 Daltons to about 120,000 Daltons, and preferably from about 40,000 Daltons to about 110,000 Daltons, or preferably from about 50,000 Daltons to about 100,000 Daltons.

The weight average molecular weight of the at least one inner stage ranges from about 150,000 Daltons to about 260,000 Daltons, preferably from about 160,000 Daltons to about 250,000 Daltons, and more preferably from about 170,000 Daltons to about 240,000 Daltons.

The weight average molecular weight of the aggregate the copolymer latex particle including all stages ranges from about 100,000 Daltons to about 200,000 Daltons, preferably from about 110,000 Daltons to about 190,000 Daltons, and more preferably from about 120,000 Daltons to about 180,000 Daltons.

Another embodiment of the present invention is directed to aqueous latex architectural compositions comprising the inventive 2-stage or 3-stage latex particle discussed herein, an optional opacifying pigment and a hydrazine or hydrazone compound to crosslink with the at least one crosslinking monomer.

Another embodiment is directed to a copolymer latex particle comprising at least a core stage and a shell stage. The core stage is formed from a core monomer mixture of one or more film forming monomers, and the calculated glass transition temperature (Tgc) of the core stage ranges from about 25° C. to about 100° C. The shell stage is formed from a shell monomer mixture of one or more film forming monomers that is different than the core monomer mixture, wherein said shell monomer mixture includes at least one crosslinking monomer and wherein an outer portion of the shell stage is copolymerized in the presence of a chain transfer agent (CTA). The at least one crosslinking monomer ranges from about 1 wt. % to about 8 wt. % of the entire polymer of the total monomers in the latex particle, and the CTA ranges from about 0.2 wt. % to about 1 wt. % of the entire polymer of the total monomers in the latex particle. The outer portion of the shell stage with the CTA makes up from about 15 wt. % to about 90 wt. % of the outer stage, preferably from about 15 wt. % to about 70 wt. %, about 15 wt. % to about 35 wt. % of the outer stage, more preferably about 20 wt. %±1.5 wt. %. In this embodiment, the crosslinking monomer is distributed throughout the shell stage.

DETAILED DESCRIPTION OF THE PREFERRED EMBODIMENTS

The present invention is directed to latex resins for aqueous architectural compositions, such as paints and stains, that form paint films that have good blocking resistance when the paints dry or soon thereafter, preferably within one hour after the paint is applied. The latex resins can be a preferred multi-stage polymer or a less preferred single-stage polymer. Advantageously, consumers can be assured that the paints or stains resist blocking soon after the paints or stains are applied.

The inventive polymeric latex resins can improve the blocking resistance of a paint film without the addition of anti-blocking additives. Commonly used anti-blocking additives include silicon-based materials, fluoro-surfactants commercially available as Capstone™ FS family of surfactants, and waxes. During film formulations, these additives migrate to the surface of the film to form a release layer that reduces the intermingling of contacting resin films as described in "Fluoroadditives: Antiblock Characteristics in Architectural Paint Systems" PCI Paint& Coating Industry Magazine, 1 Oct. 2003. As shown in the Examples below, the inventive polymeric latex resins improve the anti-blocking property of the paint films without anti-blocking additives. It is anticipated that anti-blocking additives are used in conjunction with the inventive polymeric latex resins to maximize the paint films' blocking resistance.

Without being bound to any particular theory, the present inventors believe that for a multi-stage polymer, the core should be hard or having a high Tg or MFFT to provide good blocking resistance. Preferably, one or more monomers with crosslinking capability, such as diacetone acrylamide (DAAM), are added to the monomer mix for the core to provide resistance to scrubbing. The crosslinking monomer preferably crosslinks with a hydrazine or hydrazone compound present in the aqueous phase of the architectural coating. The present inventors also believe that the crosslinking monomers add structural integrity to the resin to boost or maintain the paint film's scrubbability. Additionally, omitting crosslinking monomers from the outer stage may keep the outer stage from reducing the paint film's cleanse-ability. The outer stage or the shell should have low molecular weight preferably by adding CTA into the polymerization of the outer stage, and the outer stage preferably has lower Tg or MFFT to provide good film coalescence and film formation. Lower MW monomer chains have better mobility and help the latex particles to coalesce faster to provide early block resistance.

Without being bound to any particular theory, the present inventors believe that the inclusion of a chain transfer agent to lower the molecular weight in the shell or outer stage, as illustrated in the Examples and samples below, in combination with a relatively larger shell, preferably greater than about 65 wt. % of all monomer weight in the latex polymer, preferably greater than 70 wt. % or 75 wt. %, provides the inventive latex with the ability to exhibit block resistance after one-hour of application to the substrates.

When the multi-stage polymer has a third stage or more, which preferably is/are the innermost stage(s) and is/are softer than the hardest stage. The hardest stage is preferably smaller in size and weight, and is preferably sandwiched between a softer inner stage and a softer shell. The crosslinking monomer is preferably added to the monomer mixes for the innermost and/or the middle stages to improve scrubbability. The resulting polymer possesses good blocking resistance, scrubbability and good cleanse-ability. Preferably, the Tg for each of the stages of the multi-stage polymer would be distinct from each other.

Without being bound to any particular theory, the present inventors believe that for a single-stage polymer with substantially the same Tg throughout the polymer or Tg only gradually changing within the polymer, the hardness of the polymer varies from hard within the innermost region and becoming softer in the outermost region. The addition of CTA to the later part of the polymerization reduces the molecular weight of the polymer. This would mimic the structure and properties of the inventive multi-stage polymer.

The MFFT of the inventive polymer should be low enough for LTC, i.e., preferably less than about 15° C. or about 10° C., preferably less than about 5° C. or about 0° C. For multi-stage polymers, in the innermost region the monomer mix should have an amount of the crosslinking monomer to increase hardness, and in the outermost region CTA is added to reduce the MW for coalescence.

Tg can be readily calculated by Fox's equation, as discussed below, which aggregates the weight fraction of each monomer and the Tg of a mono-polymer made entirely from that monomer. As calculated, Tg generally does not include the hardness caused by the cross-linking of the polymer chains. The crosslinking monomer(s) when added to the monomer mixture typically is used in relatively low amounts, e.g., less than about 10 wt. %, discussed below. Preferably, the calculated Tg includes the film forming monomers. The cross-linking monomers, and any monomer whose contribution to the polymer is less than about 1.5 wt.

% and whose Tg is not widely available, such as wet adhesion monomers are omitted from the Tg calculations. CTA is also omitted from the Tg calculations.

The aggregated Tg of a co-polymer calculated by Fox's equation includes the individual Tg of various monomers being co-polymerized, as follows:

$$1/Tg_{agg} = Wf_1/Tg_1 + Wf_2/Tg_2 + Wf_x/Tg_x,$$

where $Tg_{agg}$ is the aggregated Tg of the co-polymer $Wf_x$ is the weight fraction of each monomer x $Tg_x$ is the Tg of a polymer made from the single monomer x x is the number of monomers in the co-polymer Differential scanning calorimetry (DSC) is a technique commonly used to measure experimentally the response of polymers to heating. DSC can be used to study the melting of a crystalline polymer or the glass transition to measure Tg. DSC can measure the hardness caused by crosslinking of the polymers resulting in higher Tg, as well as the hardness of the un-crosslinked polymers. The DSC set-up generally comprises a measurement chamber housing two pans and a computer to control the heating of the pans. The sample pan contains the material being investigated. A second pan, which can be empty, is used as a reference. The computer is used to monitor the temperature and regulate the rate at which the temperature of the pans changes. A typical heating rate is around 10° C./min. The rate of temperature change for a given amount of heat will differ between the two pans. This difference depends on the composition of the pan contents as well as physical changes such as phase changes. For the heat flux, the system generally varies the heat provided to one of the pans in order to keep the temperature of both pans the same. The difference in heat output of the two heaters is recorded. If a polymer in its solid state is heated it will at some point reach its Tg. At this point the mechanical properties of the polymer change from those of a brittle material to those of an elastic material due to changes in chain mobility. The heat capacity of the polymer is different before and after Tg. The heat capacity Cp of polymers is usually higher above Tg. It is important to note that the transition does not occur suddenly at one unique temperature but rather over a range of temperatures. The temperature in the middle of the inclined region is taken as the Tg. The glass transition results in a kink in the heat versus temperature plot due to the change in heat capacity. In a plot of heat flow versus temperature it is a gradual transition that occurs over a range of temperatures. The glass transition temperature is taken to be the middle of the sloped region. See generally polymerscience.physik.hu-berlin.de/docs/manuals/DSC.

The Tg values by DSC reported herein are measured with solid samples of the polymer without any of the crosslinking compounds such as hydrazine or hydrazone in the aqueous phase of the paints or stains that would crosslink with monomers such as DAAM. Hence, the Tg(DSC) reported are the Tg of the un-crosslinked polymers.

Tg of common film-forming monomers and of DAAM are listed below.

| Monomer | Tg (° C.) |
|---------|-----------|
| BA | −54 |
| 2-EHA | −50 |
| EA | −24 |
| MMA | 105 |
| MAA | 228 |

-continued

| Monomer | Tg (° C.) |
|---------|-----------|
| Styrene | 100 |
| VA | 30 |
| DAAM | 85 |

The minimum film forming temperature (MFFT) is preferably measured by ISO 2115 (April 2001). Tg and MFFT are reported in degrees Celsius. Unless noted otherwise, the Tg values reported herein are calculated by Fox's equation. Unless indicated otherwise, molecular weights are weight average molecular weights ($MW_w$). All percentages are weight percentages (wt. %). Particle sizes or particle diameters, if any, are volume average particle sizes ($D_v$).

Suitable emulsion latex particles include but are not limited to acrylic, vinyl, vinyl-acrylic or styrene-acrylic polymers or copolymers. The latex particles coalesce and/or crosslink to form a paint film on a substrate. Latexes made principally from acrylic monomers are preferred for the present invention, as illustrated in the Examples below. Exemplary, non-limiting monomers suitable to form the emulsion latex particles for the present invention are described below.

Any (meth)acrylic monomers can be used in the present invention. Suitable (meth)acrylic monomers include, but are not limited to methyl (meth)acrylate, ethyl (meth)acrylate, butyl (meth)acrylate, iso-octyl (meth)acrylate, lauryl (meth) acrylate, 2-ethylhexyl (meth)acrylate, stearyl (meth)acrylate, isobornyl (meth)acrylate, methoxyethyl (meth)acrylate, 2-ethyoxyethyl (meth)acrylate, 2-hydroxyethyl (meth)acrylate, 2-hydroxybutyl (meth)acrylate, dimethylamino ethyl (meth)acrylate, diethylaminoethyl (meth)acrylate, dimethylaminopropyl (meth)acrylamide, alkyl (meth)acrylic acids, such as methyl (meth)acrylate acids, (meth)acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, itaconic acid, itaconic mono and di-esters, and combinations thereof. The preferred alkyl (meth)acrylate monomers are methyl methacrylate and butyl acrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethyl styrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl) styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are (meth)acrylamides. Suitable monomers containing amide groups include, but are not limited to, N-vinylformamide, or any vinyl amide, N,N-dimethyl(meth)acrylamide, N-(1,1-dimethyl-3-oxobutyl)(meth)acrylamide, N-(hydroxymethyl)

(meth)acrylamide, N-(3-methoxypropyl)(meth)acrylamide, N-(butoxymethyl)(meth)acrylamide, N-(isobutoxymethyl) acryl(meth)acrylamide, N-[tris(hydroxymethyl)methyl] acryl(meth)acrylamide, 7-[4-(trifluoromethyl)coumarin] (meth)acrylamide, 3-(3-fluorophenyl)-2-propenamide, 3-(4-methylphenyl)(meth)acrylamide, N-(tert-butyl)(meth) acrylamide, and combinations thereof. These monomers can be polymerized with acrylic monomers, listed above. General formula for vinyl(form)amides are:

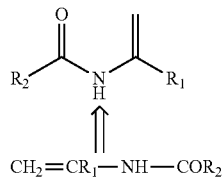

$CH_2 = CR_1 - NH - COR_2$ and (meth)acrylamides:

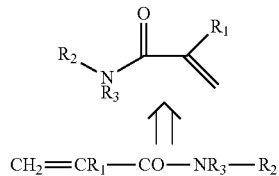

$CH_2 = CR_1 - CO - NR_3 - R_2$ where R1 and R2 can be —H, —CH$_3$, —CH$_2$CH$_3$, and other substituted organic functional groups and R3 can by —H, an alkyl or an aryl.

In one embodiment, styrene monomers, such as styrene, methylstyrene, chlorostyrene, methoxystyrene and the like, are preferably co-polymerized with (meth)acrylamide monomers.

In one embodiment, the aqueous latex polymer may also comprise vinyl monomers. Monomers of this type suitable for use in accordance with the present invention include any compounds having vinyl functionality, i.e., —CH═CH$_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl acetate, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such (meth)acrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

Suitable CTAs include but are not limited to monofunctional mercaptans such as monothiols or compounds having a sulfur-hydrogen (S—H) functionality. A preferred chain transfer agent is isooctyl 3-mercaptopropionate (iOMP), disclosed in commonly owned U.S. Pat. No. 7,642,314 to Gharapetian et al. The preferred iOMP (C$_{11}$H$_{22}$O$_2$S) chain transfer agent has the following structure:

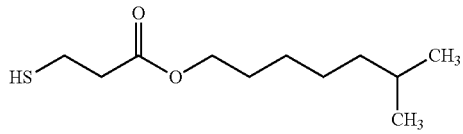

Other suitable mercaptan chain transfer include but are not limited to n-dodecyl mercaptan (n-DDM), t-dodecyl mercaptan, n-octyl mercaptan, t-octyl mercaptan, sec-octyl mercaptan, n-tetradecyl mercaptan, n-octadecyl mercaptan, n-hexyl mercaptan, n-amyl mercaptan, n-butyl mercaptan, t-butyl mercaptan, n-butyl 3-mercaptopropionate (BMP), methyl 3-mercaptopropionate, and the like, as well as mixtures thereof, disclosed in U.S. Pat. Nos. 4,593,081 and 7,256,226. The '081 patent further discloses other non-mercaptan chain transfer agents. All patent references cited in this paragraph are incorporated herein by reference in their entireties. n-DDM is another preferred chain transfer agent.

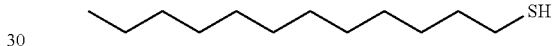

As discussed above, the latex particles may have a cross-linking monomer added to the monomer mixtures for an inner stage, such as the core or the two inner cores/stages or in the first portion of the monomer mixture. Cross-linking can improve the toughness of the dried paint film, e.g., to improve its resistance to scrubbing or to have improved scrubability. A suitable self-crosslinking moiety is formed by monomers, such as diacetone acrylamide ("DAAM") and suitable cross-linking agents include adipic acid dihydrazide ("ADH").

Suitable crosslinking monomers include but are not limited to DAAM, diacetone methacrylamide (DAMAM), acetoacetoxyethyl methacrylate (AAEM), allyl methyl acrylate (AMA) and/or 1,4-butanediol diacrylate, which is/are added to the pre-emulsion composition and can be co-polymerized with film forming monomers to form latex particles.

It has been reported that the cross-linking of polymers comprising DAAM with ADH cross-linking agent through a keto-hydrazide reaction has a substantial reaction rate in an aqueous solution. ("The diacetone acrylamide cross-linking reaction and its influence on the film formation of an acrylic latex", Journal of Coatings Technology and Research, 5(3), 285-297, 2008.) To minimize this premature cross-linking, the ADH hydrazine is substantially substituted with hydrazone(s) or blocked hydrazine particles discussed in commonly owned United States published patent application No. 2012/0142847 and in commonly owned U.S. Pat. No. 9,040,617, which are incorporated herein by reference in their entireties. The hydrazone crosslinking particles do not react with the DAAM moiety during storage, and are converted to hydrazine crosslinking particles when the aqueous component evaporates after application to a substrate.

Another way to minimize premature cross-linking during storage is to substantially remove the hydrazine (ADH) cross-linking agents and to introduce a second crosslinkable moiety, such as methacrylamide (MAM) and/or acrylamide (AM) monomer, on the latex particles. This second cross-linkable monomer is copolymerized as part of the latex particles and functions as another self-crosslinking moiety to the film forming latex particles. A small amount of hydrazine cross-linking agent, e.g., below its stoichiometric ratio with DAAM, can remain in the aqueous phase. Latex particles with multiple crosslinkable moieties are disclosed in commonly owned United States published patent application Nos. US 2014/0323635, and US 2014/0228514.

Also suitable are pre-crosslinking monomers, such as diethylene glycol dimethacrylate (DEGDMA), ethylene glycol dimethacrylate (EGDMA) and 1,3-butylene glycol diacrylate (BGDA), which crosslink during polymerization.

Additives including surfactants, initiators, chaser solutions, biocides, rheological modifiers, etc., can be added to the polymerization process.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process may include, but are not limited to, ammonium persulfate, sodium persulfate (SPS), azo initiators such as azoisobutyronitrile, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, amines such as trimethylamine, triethylamine, dimethylaminoethanol, diethylaminoethanol, AMP-95 and the like, and combinations thereof. In certain cases, compounds that qualify as pH adjusters can be added for purposes other than adjusting pH, e.g., emulsion stabilization, and yet are still characterized herein as pH adjusters.

Preferably, the latex emulsion polymers are chased with a redox (reducing agent and oxidation agent) pair to reduce the odor and to neutralize the unreacted monomers without performing the lengthy or time-consuming stripping step and requiring additional stripping equipment.

Suitable oxidizing agents include but are not limited to water-soluble hydroperoxides, tertiary butyl hydroperoxide, cumene hydroperoxide, hydrogen peroxide, sodium peroxide, potassium peroxide, sodium perborate, potassium persulfate, sodium persulfate, ammonium persulfate, persulfuric acid and salts thereof, perphosphoric acid and salts thereof, potassium permanganate, and an ammonium or alkali salt of peroxydisulfuric acid. A preferred oxidizing agent is tertiary butyl hydroperoxide (tBHP).

Suitable reducing agents include but are not limited to sodium formaldehyde sulfoxylate (SFS), ascorbic acid, isoascorbic acid, organic compounds containing thiol or disulfide groups, reducing inorganic alkali and ammonium salts of sulfur-containing acids, such as sodium sulfite, disulfite, thiosulfate, hydrosulfite, sulfide, hydrosulfide or dithionite, formadinesulfinic acid, hydroxymethanesulfonic acid, acetone bisulfite, amines, such as ethanolamine, glycolic acid, glyoxylic acid hydrate, lactic acid, glyceric acid, malic acid and tartaric acid. Preferred reducing agents include formaldehyde-free SFS and sodium salt of an organic sulfinic acid derivative.

The following non-limiting emulsion examples illustrate the polymerization of the inventive latex particles. In Examples 1-2, different amounts of a same set of monomers were used for all the stages in the polymer to achieve several distinct Tg stages. However, different combinations of monomers can be used to achieve different stages. For polymers with at least three stages, the Tg for the innermost core is generally not detectable by DSC when the stage comprises a small percentage of the total monomer weight of the polymer or when the change in phase is small, and is therefore calculated by Fox's equation. The Tg for the other two stages and the Tg for two-stage polymers are measurable by DSC. In Examples 1-2, a crosslinking monomer such as DAAM was incorporated in the core or both cores, and a CTA such as iOMP was included in the shell stage. In Example 3, which is a single-stage polymer, the crosslinking monomer was added to the monomer mixture at the beginning of the polymerization and CTA was added to the monomer mixture toward the end of the polymerization.

Example 1

3-Stage Polymer

Charge de-ionized water, surfactant, buffer to reactor and heat to 80° C. Prepare monomer pre-emulsion mixtures for core 1, core 2, and shell, separately. Charge seed to reactor (13% of core 1 pre-emulsion monomer mix) and initiator solution 1, hold 15 minutes, then feed rest of core 1 monomer mix into reactor. Once the monomers of core 1 is completely reacted, feed core 2 pre-emulsion monomer mix, followed by the shell pre-emulsion monomer mix. Total feed time is 3.5 hours. Hold time is 30 minutes. Then add chasers at 55-60° C. dropwise over 30 minutes. Cool to 35° C., neutralize with ammonia, then add biocide solution.

|  | total (g) | % solids | Amt. solids |
| --- | --- | --- | --- |
| DW | 650 | 0% | 0 |
| emulsifier | 14.0 | 25% | 3.50 |
| buffer | 1.30 | 100% | 1.30 |
| initiator | 2.2 | 100% | 2.2 |
| DW | 16.7 | 0% | 0 |

-continued

|  | Core 1 | | | Core 2 | | Shell | |
|---|---|---|---|---|---|---|---|
| DW | 132.3 | 0% | 0 | 94.5 | 0 | 151.2 | 0 |
| DAAM | 26.2 | 100% | 26.2 | 18.8 | 18.8 | 0 | 0 |
| emulsifier | 12.6 | 25% | 3.2 | 9.0 | 2.25 | 14.5 | 3.63 |
| wetting agent | 3.6 | 45% | 1.60 | 2.5 | 1.139 | 4.05 | 1.82 |
| MEEU | 9.1 | 50% | 4.55 | 6.5 | 3.263 | 10.44 | 5.22 |
| MMA | 218.6 | 100% | 218.6 | 192.4 | 192.4 | 178.4 | 178 |
| 2EHA | 171.7 | 100% | 171.7 | 86.5 | 86.5 | 267.6 | 268 |
| MAA | 4.7 | 100% | 4.7 | 3.38 | 3.375 | 5.4 | 5.4 |
| $NH_3$ | 1.4 | 28% | 0.39 | 1.0 | 0.28 | 1.6 | 0.45 |
| iOMP | 0 | 100% | 0.00 | 0 | 0.00 | 11.1 | 11.1 |
| initiator | 0.32 | 100% | 0.32 | 0.23 | 0.23 | 0.36 | 0.36 |
| DW | 7 | 0% | 0 | 7 | 0 | 10 | 0 |
| DW rinse | 40 | 0% | 0 | | | | |
| oxidizer | 2.20 | 100% | 2.2 | | | | |
| DW | 33.40 | 0% | 0 | | | | |
| reducer | 2.20 | 100% | 2.2 | | | | |
| DW | 33.40 | 0% | 0 | | | | |
| NH3 | 4.5 | 28% | 1.26 | | | | |
| biocide | 4.5 | 100% | 4.5 | | | | |
| DW | 7.5 | 0% | 0 | | | | |
| Total Latex: | | | | | | | |
| total (g) | 2475.9 | | | | | | |
| total (g) solids | 1230.6 | | | | | | |
| % solids | 49.70% | | | | | | |
| % total DAAM | 3.9% | | | | | | |
| % surfactant = | 1.50% | | | | | | |
| % total CTA | 1% | | | | | | |

DW is deionized water; emulsifier is a phosphate ester; buffer is sodium bicarbonate; initiator is a sodium persulfate (SPS); wetting agent is a neutralized alcohol phosphate; oxidizer is tertiary butyl hydroperoxide (tBHP) oxidizing agent; reducer is a sodium salt of an organic sulfinic acid derivative; and MEEU is N-(2-methacryloyloxyethyl)-ethylene urea and functions as a wet adhesion monomer. DAAM monomers are not included in the total monomer solids, and are tracked separately, due the cross-linking monomers' functionality in the present invention as discussed herewithin.

The weight percentages for the stages are 35 wt. % for core 1, 25 wt. % for core 2 and 40 wt. % for shell. The Tg are 20° C. (Fox) for core 1, 50° C. (DSC) for core 2 and −6° C. (DSC) for shell.

Example 2

2-Stage Polymer

Charge de-ionized water, surfactant, buffer to reactor and heat to 80° C. Prepare monomer pre-emulsion mixtures for core and shell separately. Charge seed to reactor (6% of core pre-emulsion) and initiator solution 1, hold 15 minutes, then feed rest of core pre-emulsion monomer mixture into reactor. Once core is completely reacted, feed the shell pre-emulsion monomer mixtures. Total feed time is 3.5 hours. Hold time is 30 minutes. Then add chasers at 55-60° C. dropwise over 30 minutes. Cool to 35° C., neutralize with ammonia, then add biocide solution.

|  | total (g) | % solids | Amt. solids |
|---|---|---|---|
| DW | 975 | 0% | 0 |
| emulsifier | 21 | 25% | 5.25 |
| buffer | 1.95 | 100% | 1.95 |
| initiator | 3.3 | 100% | 3.3 |
| DW | 25.05 | 0% | 0 |

-continued

|  | total (g) | % solids | Amt. solids | | |
|---|---|---|---|---|---|
|  | | | | Core | Shell |
| DW | 283.5 | 0% | 0 | 283.5 | 0 |
| DAAM | 67.5 | 100% | 67.5 | 0 | 0 |
| emulsifier | 27 | 25% | 6.8 | 27 | 6.75 |
| wetting agent | 7.65 | 45% | 3.44 | 7.65 | 3.4425 |
| MEEU | 19.6 | 50% | 9.788 | 19.575 | 9.7875 |
| MMA | 577.2 | 100% | 577.2 | 334.5 | 344.5 |
| 2EHA | 259.4 | 100% | 259.4 | 501.8 | 501.75 |
| MAA | 10.13 | 100% | 10.13 | 10.1 | 10.125 |
| $NH_3$ | 3 | 28% | 0.84 | 3 | 0.84 |
| iOMP | 0 | 100% | 0.00 | 16.6 | 16.65 |
| initiator | 0.68 | 100% | 0.675 | 0.68 | 0.675 |
| DW | 21 | 0% | 0 | 15 | 0 |
| DW rinse | 60 | 0% | 0 | | |
| oxidizer | 3.3 | 100% | 3.3 | | |
| DW | 50.1 | 0% | 0 | | |
| reducer | 3.3 | 100% | 3.3 | | |
| DW | 50.1 | 0% | 0 | | |
| NH3 | 7.8 | 28% | 2.142 | | |
| biocide | 6.8 | 100% | 6.75 | | |
| DW | 11.3 | 0% | 0 | | |
| Total Latex: | | | | | |
| total (g) | | | 3714.75 | | |
| total (g) solids | | | 1846.18 | | |
| % solids= | | | 49.70% | | |
| % surfactant= | | | 1.50% | | |
| total active monomer= | | | 1712.6 | | |
| % total DAAM | | | 3.9% | | |
| % total CTA | | | 1% | | |

The weight percentages for the stages are 50 wt. % for the core, and 50 wt. % for shell. The Tg are 50° C. (DSC) for the core and −6° C. (DSC) for shell.

Example 3

1-Stage Polymer

Charge de-ionized water, surfactant, buffer to reactor and heat to 80° C. Prepare monomer pre-emulsion mixture without DAAM cross-linker or iOMP chain transfer agent. Charge seed to reactor (4.8% of total pre-emulsion mixture) and initiator solution 1, hold 15 minutes, then feed rest of emulsion. Feed DAAM solution into the first 70% of the pre-emulsion. Feed iOMP into the last 30% of the pre-emulsion. Total feed time is 3.5 hours. Hold 30 minutes. Then add chasers at 55-60° C. dropwise over 30 minutes. Cool to 35° C., neutralize with ammonia, then add biocide solution.

|  | total (g) | % solids | Amt. Solids |
|---|---|---|---|
| DW | 560 | 0% | 0 |
| emulsifier2 | 5.0 | 40% | 2.00 |
| buffer | 1.30 | 100% | 1.30 |
| initiator | 2.2 | 100% | 2.2 |
| DW | 16.7 | 0% | 0 |
| DW | 378 | 0% | 0 |
| emulsifier2 | 26 | 40% | 10.4 |
| emulsifier | 20 | 25% | 5.00 |
| MEEU | 26.1 | 50% | 13.05 |
| MMA | 644.5 | 100% | 644.5 |
| 2EHA | 470.5 | 100% | 470.5 |
| MAA | 13.5 | 100% | 13.5 |
| NH$_3$ | 4 | 28% | 1.12 |
| DAAM | 45 | 100% | 45.00 |
| DW | 45 | 0% | 0.00 |
| iOMP | 6.7 | 100% | 6.70 |
| Initiator | 0.9 | 100% | 0.9 |
| DW | 24.1 | 0% | 0 |
| DW rinse | 40 | 0% | 0 |
| oxidizer | 2.20 | 100% | 2.2 |
| DW | 33.40 | 0% | 0 |
| Reducer | 2.20 | 100% | 2.2 |
| DW | 33.40 | 0% | 0 |
| NH$_3$ | 4.5 | 28% | 1.26 |
| biocide | 4.5 | 100% | 4.5 |
| DW | 7.5 | 0% | 0 |
| Total Latex: |  |  |  |
| total (g) |  |  | 2417.20 |
| total (g) solids |  |  | 1226.33 |
| % solids= |  |  | 50.73% |
| % surfactant= |  |  | 1.52% |
| total active monomer= |  |  | 1141.55 |
| % total DAAM |  |  | 3.9% |
| % total CTA |  |  | 0.6% |

In this example, the emulsifier2 is sodium alpha olefin sulfonate.

The Tg of the single-stage latex is about 20° C. (DSC).

For the present invention, which is directed to blocking resistance at a short time after the paints are applied, the standard blocking test (ASTM D4946-89) was modified to shorter elapsed time after paint application and a different numerical scale was chosen, as follows:
1. Draw down the paint composition over a white panel with a 3-mil bar and let dry in a controlled temperature (77° F. or 25° C.) and controlled humidity (50%) (CTCH) for 1 hour.
2. Cut 1-inch×1-inch squares and arrange the squares so that the painted surfaces face each other.
3. Place a 1-inch×1-inch×1-inch block weighing 100 grams-force over the squares for 3 hours at CTCH and for 3 hours in a 120° F. (49° C.) oven.
4. Remove the weight and let the squares stand at RT (77° F.) for 30 minutes.
5. Pull the squares apart.
6. Rate the blocking resistance, as follows:
  1. paint film transferred; indicate % of paint transferred,
  2. heavy tack; no paint transferred,
  3. moderate tack; no paint transferred,
  4. light tack; no paint transferred, and
  5. no tack; no paint transferred.
7. Repeat steps 2-6 two more times.
8. Average the three measurements.

Samples of inventive 1-stage, 2-stage and 3-stage polymers were polymerized similar to those shown in Examples 1-3. DAAM and iOMP were used in the following examples. The inventive polymers were used in both untinted and tinted paints. As used herein, untinted paints include paints that have binder resin and opacifying pigment, such as TiO$_2$, except for 4-base pastel paints and the optional extender pigments and additives. Untinted paints are suitable to coat/paint walls on architectural structures, such as homes, adobes and commercial buildings. Untinted paints are typically white due to the presence of the opacifying pigment. Tinted paints are untinted paints with colorants added to achieve the final color that the customers want. Colorants typically contain additional thickeners, rheological modifiers and polymeric surfactants, which can increase the paint films' tendency to block. Anti-blocking tests using tinted paints are more difficult to pass and are included to show enhanced ability of the inventive polymeric latex resin to resist blocking. As discussed above, the paints used in the tests reported below did not contain any anti-blocking additives.

TABLE 1

Performance data and results for the 3-stage polymers in untinted paints.

| | 1-hour blocking | | | | | | |
|---|---|---|---|---|---|---|---|
| Polymer # | 77° F. | | | Avg. | 120° F. | | Avg. |
| Inventive 1 | 4 | 4 | 4.5 | 4.2 | 3 | 3.5 | 4 | 3.5 |
| Inventive 2 | 4.5 | 4 | 4.5 | 4.3 | 3 | 3 | 4 | 3.3 |
| Inventive 3 | 4 | 4 | 4 | 4 | 4 | 4 | 4 | 4 |

| | Cleanse-ability | | | | | | |
|---|---|---|---|---|---|---|---|
| Polymer # | scrubs | g | k | m | w | c | total | Litter/TTP |
| Inventive 1 | 538 | 0.46 | 0.54 | 0.35 | 1.63 | 1.34 | 4.32 | 1.09/0.65 |
| Inventive 2 | 765 | 0.11 | 0.34 | 0.34 | 0.89 | 1.33 | 3.01 | 0.93/0.31 |
| Inventive 3 | 675 | 0.03 | 0.21 | 0.17 | 1.53 | 0.81 | 2.75 | 1.09/0.41 |

TABLE 2

Properties of the 3-stage polymers

| | Core 1 | | Core 2 | | Shell | | | Cross-linker (core 1 and 2) | CTA (shell) |
|---|---|---|---|---|---|---|---|---|---|
| Polymer # | Ratio | Tg | Ratio | Tg | Ratio | Tg | MFFT | | |
| Inventive 1 | 25% | 20 | 25% | 50 | 50% | −8 | 4-6 | 4% | 1% |
| Inventive 2 | 35% | 20 | 25% | 50 | 40% | −8 | 10-12 | 4% | 1% |
| Inventive 3 | 35% | 20 | 25% | 50 | 40% | −8 | 12-15 | 4% | 1% |

The Tg of core 2 and shell are measured (by DSC). The Tg of core 1 is calculated (by Fox's equation) since it does not appear on a DSC scan. The calculated Tg (Fox) for Core 2 is 38° C. Tg (DSC) is about 12° C. higher than Tg (Fox). The calculated Tg (Fox) for Shell is −6° C. Tg (DSC) is about 2° C. lower than Tg (Fox).

The blocking resistance results for the inventive 3-stage polymer show that after 1 hour of drying at room temperature or 77° F. the painted surfaces exhibited only light tacking or better, and at an elevated temperature of 120° F. the painted surfaces only show light to somewhat moderate tacking. The scrubbability of the paint films are lower than the normal ranges but remains acceptable. The scrubbability tests were conducted 7 days after the paint films were dried. The paint films are readily cleanse-able with a total score of less than 6. Higher values indicate that the stains were more difficult to remove from the paint film, and lower values are preferred. The numbers reported are the sum of the changes in color readings (Delta E values in CIE2000 units) of a pre-stained paint film and post-stained-and-washed paint film after a number of different stains (coffee, red cooking wine, tomato ketchup, yellow mustard and graphite) are applied to the paint film. The stain test presented also includes a TTP stain, which comprises raw umber, white petroleum jelly and mineral spirits, and a litter stain, which comprises lanolin, petroleum jelly, carbon black and mineral oil. Lower litter and TTP scores are preferred.

The present inventors believe that while the scrubbability of Inventive samples 4 and 6 are not as high as the scrubbability of the other Inventive samples, adding more crosslinking monomer, such as DAAM, to the core that would crosslink with the hydrazine or hydrozone crosslinking compound during film formation could improve the resistance to scrubbing. Moreover, as shown in inventive samples 1-3 adding an inner core stage improves scrubbability and blocking resistance.

The molecular weight for the shell of the inventive block resistant polymer have been calculated using gel permeation chromatography (GPC) data on substantially the same polymers as 11,612 and 17,688 Daltons. GPC is discussed in commonly owned U.S. Pat. No. 8,895,658, which is incorporated herein in its entirety. The preferred molecular weight for the shell or the outermost stage ranges from about 8,000 Daltons to about 30,000 Daltons, and preferably from about 10,000 Daltons to about 25,000 Daltons, or preferably from

TABLE 3

Performance data and results for the 2-stage polymers in tinted paints.

| polymer # | 1-hour blocking: tinted with red oxide colorant | | | | | | | |
|---|---|---|---|---|---|---|---|---|
| | 77° F. | | | Avg. | 120° F. | | | Avg. |
| Inventive 4 | 4 | 4 | 4.5 | 4.2 | 2 | 3 | 3 | 2.7 |
| Inventive 5 | 4 | 4 | 4 | 4 | 3 | 3 | 3 | 3 |
| Inventive 6 | 4.5 | 4.5 | 4.5 | 4.5 | 3 | 3 | 3 | 3 |
| Control 1 | 3 | 3 | 3 | 3 | 1(10%) | 1(20%) | 1(10%) | 1(10%) |

| Polymer # | scrubs | Total Cleanse-ability | Litter/TTP |
|---|---|---|---|
| Inventive 4 | 342 | 2.93 | 0.70/0.32 |
| Inventive 5 | 492 | 2.90 | 0.87/1.12 |
| Inventive 6 | 208 | 3.83 | 0.68/0.60 |
| Control 1 | 663 | 3.73 | 0.81/0.24 |

TABLE 4

Properties of the 2-stage polymers

| | Core | | Shell | | | X-linker | CTA |
|---|---|---|---|---|---|---|---|
| Polymer # | Ratio | Tg | Ratio | Tg | MFFT | (core) | (shell) |
| Inventive 4 | 40% | 50 | 60% | −8 | <0 | 4% | 1% |
| Inventive 5 | 50% | 50 | 50% | −8 | 17-19 | 4% | 1% |
| Inventive 6 | 40% | 63 | 60% | −8 | 2-4 | 4% | 1% |
| Control 1 | 40% | 50 | 60% | −8 | <0 | 4% | 0 |

The Tg for the core and shell are measured by DSC. The Tg(DSC) of 50° C. also corresponds to a Tg(Fox) of 38° C. The Tg(DSC) of 63° C. corresponds to a Tg(Fox) of 55° C.

Tables 3 and 4 illustrate the advantages of having CTA in the shell of a 2-stage polymer e.g., about 1% of iOMP in the shell in combination with a crosslinking monomer in the core, e.g., about 4% of DAAM in the core. The 1-hour block resistance at 77° F. is 4.0-4.5 (light tack-no tack), and the 1-hour block resistance at the elevated 120° F. is 3 (moderate tack). These examples include a control 2-stage polymer that has the crosslinking monomer in the core but no CTA in the shell. The Tg of both core and shell are similar to that of the inventive examples. The blocking resistance is significantly improved. The 1-hour block resistance at 77° F. improves substantially from 3 (moderate tack) to 4.0-4.5 (light tack-no tack), and the 1-hour block resistance at 120° F. improves substantially from 1 (10% paint film transfer) to 3 (moderate tack). These examples show the advantages of using CTA in the outermost stage.

about 10,000 Daltons to about 20,000 Daltons. As stated above, the molecular weights are reported as weight average molecular weight.

TABLE 5

Performance data and results for the less preferred single stage polymers in untinted paints.

| polymer | Avg. blocking at 77° F. | Avg. blocking at 120° F. | scrubs | Cleanse-ability | Litter/TTP |
|---|---|---|---|---|---|
| Inventive 7 | 3.3 | 1 (20%) | 1241 | 3.29 | 0.68/0.29 |
| Control 2 | 1 (<5%) | 1 (90%) | 985 | 1.97 | 0.53/0.46 |

TABLE 6

Properties of the single stage polymers

| Poly # | Tg (Fox) | Tg (DSC) | MFFT | Crosslinker | CTA |
|---|---|---|---|---|---|
| Inventive 7 | 19 | 24 | 18-19 | 4% DAAM in the inner 70% | 2% of monomer in the outer 30% |
| Control 2 | 19 | | 21-22 | None | None |

The inventive sample of the single-stage polymer shows that the difference between the Tg(Fox) and Tg(DSC) was 5° C. The blocking resistance is better than Control 2, which has no crosslinking monomer and no CTA, at both temperatures and is better than Control 2, which has more crosslinking monomer and no CTA, at the higher temperature.

A novel aspect of the inventive single-stage polymer, such as Example 3 and inventive sample 7, is that in a single stage, i.e., a stage formed from the same monomer mixture, both a cross-linkable monomer and a CTA are added sequentially with the cross-linkable monomer added at the beginning of the polymerization and the CTA added toward the end of the polymerization. Preferably, the additions of the cross-linkable monomer and the CTA do not overlap.

TABLE 7

Comparative Examples of 2-stage Polymers in Untinted Paints

| latex # | 1-hour blocking | | Core | | Shell | | MFFT | X-linker | CTA (shell) |
|---|---|---|---|---|---|---|---|---|---|
| | 77 F. | 120 F. | Ratio | Tg | Ratio | Tg | | | |
| Control 3 | 1 (30%) | 1 (100%) | 55% | 50 | 45% | −8 | 22.5 | None | None |
| Control 4 | 3.3 | 1 (90%) | 55% | 50 | 45% | −8 | 20 | None | 0.5% |

Monomers: MMA, 2EHA and styrene.

Controls 3 and 4 are 2-stage polymers and have no crosslinking monomer and Control 4 has a small amount of CTA in the shell. Neither has acceptable blocking resistance at the elevated temperature; however, Control 4 even with no crosslinking monomer in the core and only a low amount of CTA in the shell shows acceptable blocking resistance (no paint transfer) at room temperature over Control 3. These comparative examples show the efficacy of CTA in the shell and high core Tg.

The present inventors also discovered that the crosslinking monomers, such as DAAM, in addition to providing crosslinking in the inner stages or inner portion also maintain the scrubbability of the paint films.

The preferred amounts of components in the inventive polymer latex resins based on the Examples 1 and 2 and inventive samples 1-6, as well as Example 3 and inventive sample 7, are as follows. The amount of CTA in the entire polymer, such as those within the outer shell, or in a single-stage polymer is from about 0.2 wt. % to about 2.0 wt. %, preferably from about 0.5 wt. % to about 1.5 wt. %, more preferably from about 0.75 wt. % to about 1.25 wt. % of the entire polymer.

The amount of crosslinking monomer to be incorporated into the entire multi-stage or core-shell polymer, such as those within one or more core stages, or into the single-stage polymer ranges from about 1 wt. % to about 8 wt. %, preferably from about 2 wt. % to about 7 wt. %, and more preferably from about 3 wt. % to about 5 wt. % of the entire polymer.

The weight percentage of the soft, low MW outermost stage ranges from about 40 wt. % to about 65 wt. %, preferably from about 45 wt. % to about 60 wt. %. The weight percentage of the hardest inner stage ranges from about 20 wt. % to about 55 wt. %, preferably from about 25 wt. % to about 50 wt. %.

When there are three stages, the third stage is the innermost stage and makes up about from 20 wt. % to about 50 wt. %, preferably 30 wt. % to about 40 wt. %. The weight percentage of the hardest inner stage ranges from about 15 wt. % to about 35 wt. %, preferably from about 20 wt. % to about 30 wt. %. The soft, low MW outermost stage ranges from about 30 wt. % to about 50 wt. %, preferably from about 35 wt. % to about 45 wt. %.

The Tg values of the inventive polymers are defined as Tg(DSC) or Tgm (measured Tg) and as Tg(Fox) or Tgc (calculated Tg). For multi-stage polymers, including 2-stage, 3-stage and 3$^+$-stage polymers, the hardest stage within the polymers is one of the inner stage(s), i.e., not the outermost shell. The hardest stage may be the innermost core or one of the intermediate stages. The Tgc for the hardest stage ranges from about 25° C. to about 100° C., preferably from about 25° C. to about 75° C. and preferably from about 35° C. to about 60° C. The Tgm for the hardest stage ranges from about 30° C. to about 120° C., preferably from about 40° C. to about 100° C. and preferably from about 45° C. to about 80° C.

The Tgc or Tgm of the outermost stage or shell is preferable from about 45° C. to about 90° C. less than the Tgc or Tgm of the hardest stage, respectively, preferably from about 50° C. to about 80° C. less, preferably from about 55° C. to about 75° C. less.

The Tgm of the outermost stage is preferably less than about 5° C., preferably less than about 0° C. and preferably less than −5° C., and higher than about −25° C. The Tgc of the outermost stage is preferably less than about 0° C., preferably less than about −5° C. and preferably less than about −10° C. and higher than about −35° C.

The present invention can be defined with either Tg(Fox)/Tgc or Tg(DSC)/Tgm, so long as the Tg is used consistently.

As stated above, the weight average molecular weight of the outermost stage or softest stage ranges from about 8,000 Daltons to about 30,000 Daltons, and preferably from about 10,000 Daltons to about 25,000 Daltons, or preferably from about 10,000 Daltons to about 20,000 Daltons.

Another embodiment of the present invention relates to two or more stage polymers having an amount of cross-linkable monomer in the outer shell and an amount of CTA in the outer shell. Preferably, the core also contains a cross-linkable monomer and preferably the shell contains more than half of the total monomer weight of the polymer. In this embodiment, the cross-linkable monomer is added to the core monomer mixture feed and continues to be added to the beginning of the shell monomer mixture feed. The CTA is added to the second stage monomer mixture feed toward a later part of the feed. Preferably, the additions of CTA and cross-linkable monomer do not overlap, and can be added sequentially one immediately after another or can be added sequentially and spaced apart by a segment where neither is added. Alternatively, in another embodiment the CTA and cross-linkable monomer overlap. This embodiment is a combination of the single stage embodiment, shown in Example 3 and inventive sample 7, and a core including a cross-linkable monomer.

Preferably, the shell stage for this embodiment is relatively large, i.e., at least 60 wt. %, preferably at least 70 wt. % and up to at least 80 wt. % of the total monomer weight of the latex particle. Without being bound to any particular theories, the present inventors believe that at these relative weight percentages, the shell stage of the latex polymer form a continuous phase in the dry paint film. In other words, the shells form a matrix in the dry film.

The process for making the polymers according to this embodiment is shown below in Example 4.

Example 4

2-Stage Polymer

Charge de-ionized water, surfactant, buffer to reactor and heat to 80° C. Prepare monomer pre-emulsion for core/stage 1 and shell/stage 2 separately. The DAAM in stage 1 is added throughout the addition of the first stage monomer mixture. The DAAM in stage 2 is added to the first 60% by weight of the stage 2 monomer mixture. Chain transfer agent is added to the last 30% by weight of the stage 2 monomer mixture. Charge seed to reactor (15% of stage 1 emulsion by weight) and initiator solution 1, hold 15 minutes, then feed the remaining stage 1 monomer mixture into reactor with 30 wt. % of initiator 2 over one hour. Once the core is completely reacted, feed the shell monomer mixture along with the remaining portion of initiator 2. Total feed time is 3.5 hours. Hold 30 minutes. Then add chasers at 55-60° C. dropwise over 30 minutes. Cool to 35° C., neutralize with ammonia, then add biocide solution.

|  | total (g) | % solids | Amt. solids |  |  |
|---|---|---|---|---|---|
| DW | 730 | 0% | 0 |  |  |
| Surfactant 1 | 14 | 25% | 3.5 |  |  |
| buffer | 1.3 | 100% | 1.3 |  |  |
| Initiator 1 | 19 | 11.6% | 2.2 |  |  |
|  | Core |  |  | Shell |  |
| DW | 100 | 0% | 0 |  |  |
| DAAM | 19 | 100% | 19 | 26 | 26 |
| Surfactant 1 | 19 | 25% | 4.75 | 25 | 6.25 |
| Surfactant 2 | 3 | 45% | 1.35 | 7 | 1.8 |
| Wet adhesion monomer | 8 | 50% | 4 | 18 | 9 |
| MMA | 283 | 100% | 283 | 382 | 382 |
| 2-EHA | 52 | 100% | 52 | 398 | 398 |
| MAA | 4 | 100% | 4 | 9.5 | 9.5 |
| CTA (IOMP) | 0 | 100% | 0.00 | 4.5 | 4.5 |
| Initiator 2 | 25 | 3.6% | 0.9 |  |  |
| DW rinse | 60 | 0% | 0 |  |  |
| oxidizer | 35 | 6.3% | 2.2 |  |  |
| reducer | 35 | 6.3% | 2.2 |  |  |
| $NH_3$ | 5.3 | 28% | 1.5 |  |  |
| biocide | 4.5 | 16% | 0.72 |  |  |
| latex solids in stage |  |  | 362 g |  | 829 g |
| total latex solids |  | 1,191 g |  |  |  |
| % solids |  | 47.7% |  |  |  |
| % DAAM in polymer |  | 3.8% |  |  |  |
| % CTA in polymer |  | 0.38% |  |  |  |

Inventive Samples 8-15 were made using the polymerization methodology discussed in Example 4. The numerical values reported in Example 4 reflect inventive sample 14. MMA and 2-EHA, as well as a small amount of MAA were used in the monomer mix to reach the Tg reported below. The monomers' glass transition temperatures used in Example 4 and inventive samples 8-15 are 105° C. for MMA, −50° C. for 2-EHA and 228° C. for MAA, and the composite Tg is calculated by Fox's equation. Small amount of wet adhesion monomers (less than 1 wt. %) may be omitted from the Tg calculations, and the crosslinking monomer and the CTA are omitted from the Tg calculations.

About 4 wt. % of cross-linkable monomer, i.e., DAAM, of the total monomers and about 0.4% of the CTA, i.e., IOMP, of the total monomers was used in the polymerization process. The DAAM monomer was added to the first 70% of the addition of the total monomer mixture, including the first and second stages, and the CTA/IOMP was added the last 20% of the total monomer mix which includes only the second or shell stage. After polymerization is completed, about 60 wt. % of the second or shell stage contains DAAM and about 30 wt. % of the second stage contains CTA. The inventive samples and control samples in the Tables 8 and 9 below are low VOC 50 g/l), semi-gloss, 1-base untinted paint compositions, with no anti-blocking additive such as fluorosurfactant. Sufficient amount opacifying pigment, $TiO_2$, was added to the latex resins in the letdown stage to make 1-base paints. All paint samples passed the low temperature coalescent (LTC) test at 10° C. Similar to the Tgc discussed above in connection with Examples 1-3 and their associated inventive samples, the Tgc in Table 8 for Example 4 and inventive samples 8-15 do not include the DAAM crosslinking monomer.

TABLE 8

| | Resin Morphology | | | | |
|---|---|---|---|---|---|
| Resin ID | Stage 1 Tgc (° C.) | Stage 2 Tgc (° C.) | ΔTg (° C.) | Stage 1/Stage 2 ratio | MFFT (° C.) |
| Control 5 | 2 | n/a | — | one-stage | 0 |
| Control 6 | 15 | n/a | — | one-stage | 15 |
| Inventive 8 | 38 | −6 | 44 | 30/70 | −5 |
| Inventive 9 | 38 | 6 | 32 | 30/70 | 12 |
| Inventive 10 | 38 | 14 | 24 | 30/70 | 19 |
| Inventive 11 | 53 | 6 | 47 | 30/70 | 18 |
| Inventive 12 | 53 | 14 | 39 | 30/70 | 24 |
| Inventive 13 | 68 | −6 | 74 | 30/70 | −2 |
| Inventive 14 | 68 | 6 | 62 | 30/70 | 20 |
| Inventive 15 | 68 | 14 | 54 | 30/70 | 30 |

TABLE 9

| | Persoz hardness | | 1-hour Dry Blocking | | Scrub | cleans- ability |
|---|---|---|---|---|---|---|
| Resin ID | 1 week | 4 weeks | RT | 50° C. | cycles | total ΔE |
| Control 5 | 19.0 | 20.7 | 1 (43%) | 1 (50%) | | |
| Control 6 | 22.7 | 22.3 | 1 (<5%) | 1 (80%) | | |
| Inventive 8 | 37.7 | 40.0 | 4 | 3 | 1032 | 2.07 |
| Inventive 9 | 48.0 | 58.0 | 4 | 2 | 1132 | 1.72 |
| Inventive 10 | 50.7 | 63.3 | 4 | 2 | 1200 | 1.56 |
| Inventive 11 | 49.7 | 56.7 | 4 | 3 | 935 | 2.55 |
| Inventive 12 | 54.0 | 62.7 | 4 | 2 | 1019 | 3.01 |
| Inventive 13 | 45.7 | 47.0 | 5 | 4 | 888 | 3.20 |
| Inventive 14 | 53.7 | 60.0 | 5 | 4 | 924 | 2.40 |
| Inventive 15 | 52.7 | 63.0 | 5 | 4 | 937 | 3.03 |

RT or room temperature is about 77° F. or 25° C.

Weight average molecular weights (Mw) of the controls and Inventive 14 are shown in Table 10 below. The molecular weight of Inventive 14 is representative of the molecular weight of Inventive 8-15.

TABLE 10

| | Molecular Weight, Mw (Da) | | |
|---|---|---|---|
| Resin ID | Core | Shell | Final |
| Commercial 1 | n/a | n/a | 177,695 |
| Commercial 2 | n/a | n/a | 222,180 |
| Inventive 14 | 189,359 | 68,283 | 128,821 |

As shown in Tables 8-10, the inventive samples 8-15 display good resistance to blocking at RT and acceptable blocking resistance at 50° C. The samples with lower calculated Tg in the core or lower ΔTg have generally lower blocking resistance (samples 8-10), albeit acceptable block resistance. The samples with higher Tg or higher ΔTg have generally higher blocking resistance (samples 13-15). The resistance to scrubbing or scrubbability generally decreases as the core Tg or ΔTg increases. The cleansibility slightly decreases as the core Tg or ΔTg increases.

The hardness of the dried film was evaluated by monitoring the damping of the oscillations of a pendulum by the dried film (Persoz hardness) which is directly related to the softness of the sample. Persoz values are higher for a harder dried film. Higher Persoz hardness values at 4 weeks compared to 1 week suggests improving blocking resistance as the paint films age.

The ΔTg for samples 8-15 and Example 4 can be less than 45° C. The amount of CTA used in these samples are lower than those in inventive samples 1-6 and Examples 1-2 and the weight average molecular weight for samples 8-15 are consequently higher than those in samples 1-6.

Example 5. Another experiment was conducted with the DAAM monomer admixed throughout the shell stage and a CTA (iOMP) added to the last 20% of the shell monomer mixture. In this experiment, the core makes up about 30 wt. % of the polymer latex and the shell makes up about 70 wt. % of the polymer latex.

|  | total (g) | % solids | Amt. solids |  |  |
|---|---|---|---|---|---|
| DW | 750 | 0% | 0 |  |  |
| Surfactant 1 | 14 | 25% | 3.5 |  |  |
| buffer | 1.3 | 100% | 1.3 |  |  |
| Initiator 1 | 18.9 | 11.6% | 2.2 |  |  |
|  |  | Core |  | Shell |  |
| DW | 113.4 | 0% | 0 | 264.6 | 0 |
| DAAM | 0 | 100% | 0 | 45 | 45 |
| Surfactant 1 | 10.8 | 25% | 2.7 | 25.2 | 6.3 |
| Surfactant 2 | 3 | 45% | 1.35 | 7 | 3.2 |
| Wet adhesion monomer | 7.83 | 50% | 3.9 | 18.3 | 9.1 |
| MMA | 230.8 | 100% | 230.8 | 312.2 | 312.2 |
| 2-EHA | 103.7 | 100% | 103.7 | 463 | 463 |
| MAA | 4 | 100% | 4 | 9.5 | 9.5 |
| CTA (IOMP) | 0 | 100% | 0.00 | 4.5 | 4.5 |
| Initiator 2 | 7.47 |  | 0.27 | 17.4 | 0.63 |
| DW rinse | 40 | 0% | 0 |  |  |
| oxidizer | 35 | 6.3% | 2.2 |  |  |
| reducer | 35 | 6.3% | 2.2 |  |  |
| NH₃ | 5.3 | 28% | 1.5 |  |  |
| biocide | 4.5 | 16% | 0.72 |  |  |
| latex solids in stage |  |  | 342.4 g (30%) | 838.8 g (70%) |  |
| total solids |  | 1,223.6 g |  |  |  |
| % solids |  | 47.6% |  |  |  |
| % DAAM in polymer |  | 3.8% |  |  |  |
| % CTA in polymer |  | 0.4% |  |  |  |
| CTA was added to last 20% of the total monomers in the entire latex, or the last 30% of shell monomers |  |  |  |  |  |
| Total active monomer |  | 1141.55 g |  |  |  |

Example 6 is similar to Example 5, except that the DAAM was admixed to the first 70% of both monomer mixes, so that the entire core includes DAAM and an inner portion of the shell also includes DAAM. The CTA (0.4 wt. %) is also added to the last 20% of the total monomers for the latex particle including the core and shell, or the last 30% of the shell monomer mixture in Examples 5 and 6.

Example 5 investigates the film properties when the crosslinking monomer is admixed throughout the shell. Example 6 is inventive sample 8, discussed above, and is used here for comparison to Example 5. The properties of the paint films from inventive Examples 5 and 6 are shown below.

| | Resin Morphology | | | | | |
|---|---|---|---|---|---|---|
| Resin ID | Stage 1 Tgc (° C.) | Stage 2 Tgc (° C.) | ΔTg (° C.) | Stage 1/Stage 2 ratio | MFFT (° C.) | Scrubb-ability |
| Example 5 | 38 | −6 | 44 | 30/70 | −5 | 985 |
| Example 6 | 38 | −6 | 44 | 30/70 | −5 | 1177 |

| | Blocking Resistance | | | | | |
|---|---|---|---|---|---|---|
| Resin ID | RT | | | 120° F. | | |
| Example 5 | 3 | 3 | 2 | 2 | 2 | 2 |
| Example 6 | 5 | 5 | 5 | 4 | 4 | 4 |

| | Cleanse-ability | | | | | | |
|---|---|---|---|---|---|---|---|
| Resin ID | scrubs | g | k | m | w | c | total | Litter/TTP |
| Example 5 | 985 | 0.62 | 0.17 | 0.22 | 0.97 | 1.02 | 3.00 | 0.68/0.49 |
| Example 6 | 1177 | 0.79 | 0.25 | 0.16 | 0.88 | 1.05 | 3.13 | 1.60/0.59 |

The inventive samples in Examples 5 and 6 show that when the crosslinking monomer is evenly admixed or distributed in the outer shell stage but not the core stage while the CTA is admixed to the outer 20% of the outer shell, the polymer resin passes the block resistance criteria (2-3 at RT and 2 at 120° F.) and has good cleansability and scrubbability. These results also show that when the crosslinking monomer is admixed to the core and an inner portion of the shell and the CTA is admixed last 20% of the outer shell, the block resistance is increased (5 at RT and 4 at 120° F.) and the scrubbability is also increased, while the cleansability remain substantially the same.

The preferred amounts of components in the inventive polymer latex resins from the embodiment of Examples 3 and 4 and inventive samples 7 and 8-15, as well as inventive Examples 5 and 6, are discussed in the next several paragraphs. The amount of CTA in the entire polymer, such as those within the outer shell, or in a single-stage polymer is from about 0.20 wt. % to about 1.0 wt. %, preferably from about 0.25 wt. % to about 0.90 wt. %, more preferably from about 0.30 wt. % to about 0.80 wt. % of the entire polymer.

The amount of crosslinking monomer to be incorporated into the entire multi-stage or core-shell polymer, such as those within one or more core stages, or into the single-stage polymer ranges from about 1 wt. % to about 8 wt. %, preferably from about 2 wt. % to about 7 wt. %, and more preferably from about 3 wt. % to about 5 wt. % of the entire polymer.

The weight percentage of the soft, low MW outermost stage ranges from about 60 wt. % to about 80 wt. %, preferably from about 65 wt. % to about 75 wt. %, or from 67.5 wt. % to 72.5 wt. %. The weight percentage of the hardest inner stage ranges from about 20 wt. % to about 40 wt. %, preferably from about 25 wt. % to about 35 wt. %.

The Tg values of the inventive polymers in the embodiments of Examples 3 and 4 and inventive samples 7 and 8-15 are Tg(Fox) or Tgc (calculated Tg). The harder stage within the polymers is the inner stage or core and the softer stage is the outer stage or shell. The Tgc for the harder stage ranges from about 25° C. to about 100° C., preferably from about 30° C. to about 85° C. and preferably from about 35° C. to about 75° C. Alternatively, Tgm, if used, for the hardest stage ranges from about 30° C. to about 120° C., preferably from about 40° C. to about 100° C. and preferably from about 45° C. to about 80° C.

The Tgc or Tgm of the softer outermost stage or shell is preferable from about 20° C. to about 90° C. less than the Tgc or Tgm of the harder stage, i.e. ΔTg, preferably from about 50° C. to about 80° C. less, preferably from about 55° C. to about 75° C. less. The Tgm of the softer outermost stage is preferably less than about 15° C., preferably less than about 10° C. and preferably less than 0° C., and higher than about −25° C. The Tgc of the softer outermost stage is preferably less than about 15° C., preferably less than about 10° C. and preferably less than about 0° C. and higher than about −25° C. The present invention can be defined with either Tg(Fox)/Tgc or Tg(DSC)/Tgm, so long as the Tg is used consistently.

The weight average molecular weight of the overall outermost stage or softest stage including the portions with and without CTA ranges from about 30,000 Daltons to about 120,000 Daltons, and preferably from about 40,000 Daltons to about 110,000 Daltons, or preferably from about 50,000 Daltons to about 100,000 Daltons.

Within the softest or outermost stage, the weight average molecular weight of the portion without CTA is from about 100,000 Daltons to about 150,000 Daltons, and the weight average molecular weight of the portion with CTA is from about 8,000 Daltons to about 30,000 Daltons, preferably from about 10,000 Daltons to about 20,000 Daltons. The portion with the CTA makes up from about 10 wt. % to about 60 wt. % of softest or outermost stage, preferably from about 15 wt. % to about 35 wt. % of that stage, more preferably about 20 wt. %±1.5 wt. % of that stage.

For the embodiment shown in Example 5 where the crosslinking monomer is distributed throughout the shell stage, the CTA portion can make up from about 15 wt. % to about 90 wt. % of said at least one stage, preferably from about 15 wt. % to about 70 wt. %, about 15 wt. % to about 35 wt. % of said at least one stage, more preferably about 20 wt. %±1.5 wt. %.

The weight average molecular weight of inner harder stage ranges from about 150,000 Daltons to about 260,000 Daltons, preferably from about 160,000 Daltons to about 250,000 Daltons, and more preferably from about 170,000 Daltons to about 240,000 Daltons.

The weight average molecular weight of the aggregate multi-stage latex including all the stages ranges from about 100,000 Daltons to about 200,000 Daltons, preferably from about 110,000 Daltons to about 190,000 Daltons, and more preferably from about 120,000 Daltons to about 180,000 Daltons.

It is noted that the embodiment of Examples 3 and 4 and inventive samples 7 and 8-15, as well as Examples 5 and 6, can have any number of stages from 1 (Example 3) to 2 (Example 4) or more, so long as the outermost stage has both cross-linkable monomer and CTA added to the monomer mix for the outermost stage, as described herein. In other words, this embodiment may have any number or inner stages or cores.

In yet another embodiment, in Example 7 the inner stage or core is made from softer monomers with lower Tg, while the outer stage of shell is made with harder monomers with higher Tg. A CTA is added to the last 30%-50% of the outer stage/shell monomer mix for the multi-stage polymer. MMA, 2-EHA and styrene are the film-forming monomers used in combinations to reach the reported Tgc. Tables 11 and 12 below summarize the results of this embodiment.

TABLE 11

Additional Embodiments: soft core, hard shell

Resin Morphology

| Resin ID | Stage 1 Tg (° C.) | Stage 2 Tg (° C.) | Stage 1/ Stage 2 ratio | MFFT (° C.) | other |
|---|---|---|---|---|---|
| Inventive 16 | 3 | 70 | 70/30 | 6 | |
| Inventive 17 | 3 | 70 | 50/50 | 14 | |
| Inventive 18 | 6 | 68 | 50/50 | 43 | DVB in stage 2 |

DVB = divinyl benzene (0.8 wt. %) for crosslinking in addition to DAAM (4 wt. %)

Additional composition information of the experimental resins in listed Table 3:
MMA/2EHA/Styrene monomers used to reach Tgc
4% DAAM
0.8% chain transfer agent in the last 30-50% of the particle

| | Stage 1 composition | | | | Stage 2 composition | | | |
|---|---|---|---|---|---|---|---|---|
| Resin ID | MMA | 2EHA | Sty | Tgc | MMA | 2EHA | Sty | Tgc |
| Inventive 16 | 0 | 51.5 | 48.5 | 4° C. | 85.5 | 14.5 | 0 | 70° C. |
| Inventive 17 | 0 | 51.5 | 48.5 | 4° C. | 85.5 | 14.5 | 0 | 70° C. |
| Inventive 18 | 7.2 | 50.3 | 42.5 | 6° C. | 83.5 | 16.5 | 0 | 66° C. |

TABLE 12

Additional Embodiment: soft core, hard shell
Paint Results

| | Persoz hardness | | 1-hour Dry Blocking | | Scrub cycles | cleans-ability total dE |
|---|---|---|---|---|---|---|
| Resin ID | 1 week | 4 weeks | room temp | 50° C | | |
| Inventive 16 | 48.7 | 57.3 | 3 | 1 (<5%) | 1153 | 3.98 |
| Inventive 17 | 64.7 | 74.7 | 5 | 1 (<5%) | 653 | 2.08 |
| Inventive 18 | 51.3 | 57.0 | 5 | 4 | 311 | 1.40 |

The scrubbability number means the number of cycles of scrubbing before the paint film fails, and the higher scrubbability number means higher resistance to scrubbing. Scrubbability test results show the number of scrub cycles before failure and the test is conducted pursuant to ASTM D2486 Method B.

The stain removal test conducted in these experiments including the type of stains is described above and is similar to the Master Paint Institute (MPI) COR-MTD-119 standard. Higher values indicate that the stains were more difficult to remove from the paint film. Lower values are more preferred. The numbers reported are the sum of the changes in color readings (Delta E values in CIE2000 units) of a pre-stained paint film and post-stained-and-washed paint film after a number of different stains are applied to the paint film. The stains include hot regular coffee, red cooking wine, tomato ketchup, yellow mustard and graphite. The cleaning solution comprises 0.5% nonyl phenoxy ethanol, 0.25% trisodium phosphate (TSP) and 99.25% deionized water. The cleaning solution is applied by a 430 g sponge/holder for 500 cycles. The changes of color caused by each stain are added and reported for each Example. Alternatively, a less preferred and less stringent stain removal test, MPI COR-MTD-083, can also be used.

The total number in the stain test is the combination of measured stains caused by the various common substances. The lower stain number means less stains were measured and means better stain resistance. The stain resistance values reported herein are less than 6.0 for the controls and inventive samples and are within the acceptable range. Preferably, stain resistance values of less than 8.0, more preferably less than 7.0 and more preferably less than 6.0 are acceptable.

The stain test presented also includes a TTP stain, which comprises raw umber, white petroleum jelly and mineral spirits, and a litter stain, which comprises lanolin, petroleum jelly, carbon black and mineral oil. Lower litter and TTP scores, e.g., ΔE values of less than about 1.5 DE2000, or less than 1.25 DE2000 units are preferred.

In the LTC test, paint is applied at various thicknesses, e.g., from 3 mils to 12 mils (1 mil=1/1000 inch). The thickness at which the paint film cracks is the failure point. The LTC is the highest thickness in mils that a paint film without cracks is obtained. The higher the LTC value the better the coalescence, and the least amount of external plasticizer or coalescing agent is needed for film formation. LTC is used to determine the comparative coalescence of a series of latex paints by noticing how samples are dried at standard and low temperatures. Coalescence is the formation of a film of resinous or polymeric material when water evaporates from an emulsion or latex system, permitting contact and fusion of adjacent latex particles. Thus, this test evaluates the paint film formation under standard and low temperature. Cracking indicates a poor film formation. Alternatively, the LTC test may be conducted in accordance with ASTM D3793.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A copolymer latex particle comprising at least one stage,
    wherein said at least one stage is formed from a first monomer mixture of one or more film forming monomers, wherein said at least one stage is copolymerized with at least one crosslinking monomer and said first monomer mixture to form an inner portion of said at least one stage and wherein an outer portion of said at least one stage is copolymerized in the presence of a chain transfer agent (CTA) and said first monomer mixture,
    wherein the at least one crosslinking monomer ranges from about 1 wt. % to about 8 wt. % of the entire polymer of the total monomers in the latex particle, wherein the CTA ranges from about 0.2 wt. % to about 1 wt. % of the entire polymer of the total monomers in the latex particle, and
    wherein the inner portion and the outer portion do not overlap, wherein the outer portion makes up from about 10 wt % to about 60 wt % of said at least one stage.

2. The copolymer latex particle of claim 1, wherein the at least one crosslinking monomer ranges from about 2 wt. % to about 7 wt. % of the entire polymer of the total monomers in the latex particle.

3. The copolymer latex particle of claim 2, wherein the at least one crosslinking monomer ranges from about 3 wt. % to about 5 wt. % of the entire polymer of the total monomers in the latex particle.

4. The copolymer latex particle of claim 1, wherein the CTA ranges from about 0.25 wt. % to about 0.90 wt. % of the entire polymer of the total monomers in the latex particle.

5. The copolymer latex particle of claim 4, wherein the CTA ranges from about 0.30 wt. % to about 0.80 wt. % of the entire polymer of the total monomers in the latex particle.

6. The copolymer latex particle of claim 1, wherein the inner portion and the outer portion are spaced apart by an intervening portion that does not contain the at least one crosslinking monomer and the CTA.

7. The copolymer latex particle of claim 1 further comprising at least one inner stage formed from an inner monomer mixture of one or more film forming monomers that is different than the first monomer mixture, wherein the calculated glass transition temperature (Tgc) of the at least one inner stage ranges from about 25° C. to about 100° C.

8. The copolymer latex particle of claim 7, wherein the inner monomer mixture further comprises the at least one crosslinking monomer.

9. The copolymer latex particle of claim 7, wherein the Tgc of the at least one inner stage is about 20° C. to about 90° C. higher than the Tgc of said at least one stage.

10. The copolymer latex particle of claim 7 further comprises an innermost stage inside of the at least one inner stage.

11. The copolymer latex particle of claim 7 further comprises a second inner stage outside of the at least one inner stage.

12. The copolymer latex particle of claim 1, wherein the overall weight average molecular weight of the at least one stage ranges from about 30,000 Daltons to about 120,000 Daltons.

13. The copolymer latex particle of claim 7, wherein the overall weight average molecular weight of the at least one stage ranges from about 30,000 Daltons to about 120,000 Daltons.

14. The copolymer latex particle of claim 13, wherein the overall weight average molecular weight of the at least one stage ranges about 40,000 Daltons to about 110,000 Daltons.

15. The copolymer latex particle of claim 14, wherein the overall weight average molecular weight of the at least one stage ranges about 50,000 Daltons to about 100,000 Daltons.

16. The copolymer latex particle of claim 13, wherein the weight average molecular weight of the at least one inner stage ranges from about 150,000 Daltons to about 260,000 Daltons.

17. The copolymer latex particle of claim 13, wherein the weight average molecular weight of the aggregate of the at least one stage and the at least one inner stage ranges from about 100,000 Daltons to about 200,000 Daltons.

18. A copolymer latex particle comprising at least a core stage and a shell stage,
    wherein the core stage is formed from a core monomer mixture of one or more film forming monomers, wherein the calculated glass transition temperature (Tgc) of the core stage ranges from about 25° C. to about 100° C., wherein the shell stage is formed from a shell monomer mixture of one or more film forming monomers that is different than the core monomer mixture, wherein said shell monomer mixture includes at least one crosslinking monomer and wherein an outer portion of the shell stage is copolymerized in the presence of a chain transfer agent (CTA), wherein the at least one crosslinking monomer ranges from about 1 wt. % to about 8 wt. % of the entire polymer of the total monomers in the latex particle, wherein the CTA ranges from about 0.2 wt. % to about 1 wt. % of the entire polymer of the total monomers in the latex particle, and wherein the outer portion of the shell stage with the CTA makes up from about 15 wt. % to about 90 wt. % of the shell stage.

19. The copolymer latex particle of claim 1, wherein the outer portion makes up from about 15 wt. % to about 35 wt. % of said at least one stage.

20. The copolymer latex particle of claim 1, wherein the outer portion makes up from about 20 wt. %±1.5% of said at least one stage.

* * * * *